(12) United States Patent
Brown et al.

(10) Patent No.: US 10,305,894 B2
(45) Date of Patent: May 28, 2019

(54) VERIFYING A USER BASED ON DIGITAL FINGERPRINT SIGNALS DERIVED FROM OUT-OF-BAND DATA

(71) Applicant: AVERON US, INC., Henderson, NV (US)

(72) Inventors: Wendell Brown, Henderson, NV (US); Evan Tann, Manitou Beach, MI (US)

(73) Assignee: AVERON US, INC., Henderson, NV (US)

(*) Notice: Subject to any disclaimer, the term of this patent is extended or adjusted under 35 U.S.C. 154(b) by 0 days.

(21) Appl. No.: 14/887,177

(22) Filed: Oct. 19, 2015

(65) Prior Publication Data

US 2016/0112416 A1    Apr. 21, 2016

Related U.S. Application Data

(60) Provisional application No. 62/065,535, filed on Oct. 17, 2014.

(51) Int. Cl.
*G06F 21/31* (2013.01)
*H04L 29/06* (2006.01)
(Continued)

(52) U.S. Cl.
CPC .... *H04L 63/0861* (2013.01); *G06F 17/30867* (2013.01); *G06F 17/30914* (2013.01);
(Continued)

(58) Field of Classification Search
CPC ............... G06F 21/316; H04L 63/0876
See application file for complete search history.

(56) References Cited

U.S. PATENT DOCUMENTS

| | | | |
|---|---|---|---|
| 8,364,965 B2 * | 1/2013 | Farrugia | G06F 21/64 713/161 |
| 2002/0038296 A1 * | 3/2002 | Margolus | G06F 17/30097 |

(Continued)

FOREIGN PATENT DOCUMENTS

| | | |
|---|---|---|
| EP | 0484686 | 5/1992 |
| EP | 2924566 | 9/2015 |

(Continued)

OTHER PUBLICATIONS

International Search Report and Written Opinion as issued in corresponding Application No. PCT/US2015/056278, dated Jan. 6, 2016.

(Continued)

*Primary Examiner* — Jason Chiang
(74) *Attorney, Agent, or Firm* — Alston & Bird LLP

(57) ABSTRACT

In general, embodiments of the present invention provide systems, methods and computer readable media for providing a user verification service based on analyzing digital fingerprint signals derived from out-of-band data (i.e., data not directly supplied by the user). In some embodiments, a digital fingerprint engine embedded in an app hosted on a client device being accessed by a user reads various device or user data and then creates a set of encoded user verification data representing out-of-band data stored locally on that device. In some embodiments, the user verification data are encoded as hashes generated by a hash function. In some embodiments, the app is configured to contact a business server via the cloud, and the set of digital fingerprints are included in an authorization request transmitted from the client device to the business server. In some embodiments, a digital fingerprint verification service verifies the set of digital fingerprints by determining whether they match any (Continued)

of a stored set of digital fingerprints representing a group of previously verified users.

20 Claims, 4 Drawing Sheets

(51) Int. Cl.
    *G06F 17/30*     (2006.01)
    *G06F 21/34*     (2013.01)
    *G06F 21/62*     (2013.01)
    *H04L 9/32*     (2006.01)

(52) U.S. Cl.
    CPC .......... *G06F 21/31* (2013.01); *G06F 21/316* (2013.01); *G06F 21/34* (2013.01); *G06F 21/6254* (2013.01); *H04L 9/3239* (2013.01); *H04L 63/0876* (2013.01)

(56) References Cited

U.S. PATENT DOCUMENTS

| | | | | |
|---|---|---|---|---|
| 2003/0135764 | A1* | 7/2003 | Lu | G07C 9/00158 |
| | | | | 726/5 |
| 2004/0139098 | A1* | 7/2004 | Margolus | G06F 17/30097 |
| 2006/0143477 | A1* | 6/2006 | Stevens, III | H04L 9/3236 |
| | | | | 713/193 |
| 2007/0110089 | A1* | 5/2007 | Essafi | H04L 29/06 |
| | | | | 370/420 |
| 2010/0005099 | A1 | 1/2010 | Goodman | |
| 2013/0031061 | A1* | 1/2013 | Jagota | G06Q 30/01 |
| | | | | 707/690 |
| 2013/0055357 | A1* | 2/2013 | Etchegoyen | G06F 21/34 |
| | | | | 726/4 |
| 2013/0073865 | A1* | 3/2013 | Kornafeld | H04L 9/3231 |
| | | | | 713/189 |
| 2013/0090088 | A1 | 4/2013 | Chevsky et al. | |
| 2013/0191909 | A1* | 7/2013 | Akil | G05B 19/0428 |
| | | | | 726/19 |
| 2013/0254833 | A1 | 9/2013 | Nicodemus et al. | |
| 2014/0066015 | A1* | 3/2014 | Aissi | H04W 12/06 |
| | | | | 455/411 |
| 2014/0109201 | A1* | 4/2014 | Israel | G06F 21/31 |
| | | | | 726/5 |
| 2014/0123255 | A1* | 5/2014 | Etchegoyen | G06F 21/44 |
| | | | | 726/7 |

FOREIGN PATENT DOCUMENTS

| | | |
|---|---|---|
| JP | H04-230566 A | 8/1992 |
| JP | 2013/120580 A | 6/2013 |
| JP | 2014/534514 | 12/2014 |
| WO | WO 2013/084617 | 6/2013 |
| WO | WO 2013/138714 | 9/2013 |

OTHER PUBLICATIONS

Extended European Search Report for European Application No. 15849954.1 dated Jun. 5, 2018, 8 pages.

Office Action for European Application No. 15849954.1 dated Jan. 15, 2019.

Office Action for Japanese Application No. 2017-539530 dated Apr. 11, 2019, 2 pages.

* cited by examiner

VERIFYING A USER BASED ON DIGITAL FINGERPRINT SIGNALS DERIVED FROM OUT-OF-BAND DATA

CROSS REFERENCE TO RELATED APPLICATIONS

This application claims the benefit of U.S. Provisional Application No. 62/065,535, entitled "TECHNIQUES FOR COUPLING NATIVE SOFTWARE APPLICATIONS WITH NON-NATIVE SOFTWARE APPLICATIONS", and filed Oct. 17, 2014, the content of which is incorporated herein by reference in its entirety.

FIELD

This specification relates to a framework for providing a user verification service based on analyzing digital fingerprint signals derived from out-of-band data (i.e., data not directly supplied by the user).

BACKGROUND

Typical user authorization systems are based on data supplied by the user (e.g., one or a combination of phone number of the user, email address, personal information such as social security number, login user id, and password). If this type of data is stolen (e.g., via identity theft or hacking), a malevolent user can use the data to be authorized in place of the rightful owner of the data. Because data theft has become widespread, it is difficult for typical user authorization systems to differentiate between a real user and a fraudulent user when processing an authorization request based on user-supplied data.

Current methods for verifying an authorization request on behalf of a user exhibit a plurality of problems that make current systems insufficient, ineffective and/or the like. Through applied effort, ingenuity, and innovation, solutions to improve such methods have been realized and are described in connection with embodiments of the present invention.

SUMMARY

In general, embodiments of the present invention provide herein systems, methods and computer readable media for providing a user verification service based on analyzing digital fingerprint signals derived from out-of-band data (i.e., data not directly supplied by the user).

In some embodiments, a digital fingerprint engine embedded in an application ("app" hereinafter) hosted on a client device being accessed by a user reads various device or user data and then creates a set of encoded user verification data ("digital fingerprints" hereinafter) representing out-of-band data stored locally on that device. The data may include certain one or multiple personal data items (e.g., contact, calendar, photo items etc.), device serial number, device UUID number, device phone number, and the like. In some embodiments, the user verification data are encoded using a one-way encoding scheme (e.g., encoded as hashes generated by a hash function).

In some embodiments, the app is configured to contact a business server via the cloud, and the set of digital fingerprints are included in an authorization request transmitted from the client device to the business server. In some embodiments, a digital fingerprint verification service verifies the set of digital fingerprints by determining whether they match any of a stored set of digital fingerprints representing a group of previously verified users. In some embodiments, a verification result returned from the digital fingerprint verification service is used by the business server in processing the authorization request.

The systems and techniques described here may provide one or more of the following advantages.

The out-of-band data are not available to hackers, and thus supply additional information for use in verifying that an authorization request is not coming from a fraudulent user. The encoding of data ensures that the user's privacy is protected, since the encoding scheme is not reversible. Thus, the digital fingerprints may be compared for verification but the user identities are anonymous.

Multiple businesses may share the same digital fingerprint verification service, optimizing the efficiency of the verification process. In some embodiments, instances of the digital fingerprint engine may be integrated into multiple apps hosted on the same client device, and generated digital fingerprints may be cached. Once a user has been verified through an authorization request sent by one app, authorization requests on behalf of the same user being sent by any of the other apps can be processed more quickly.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Figure 1:
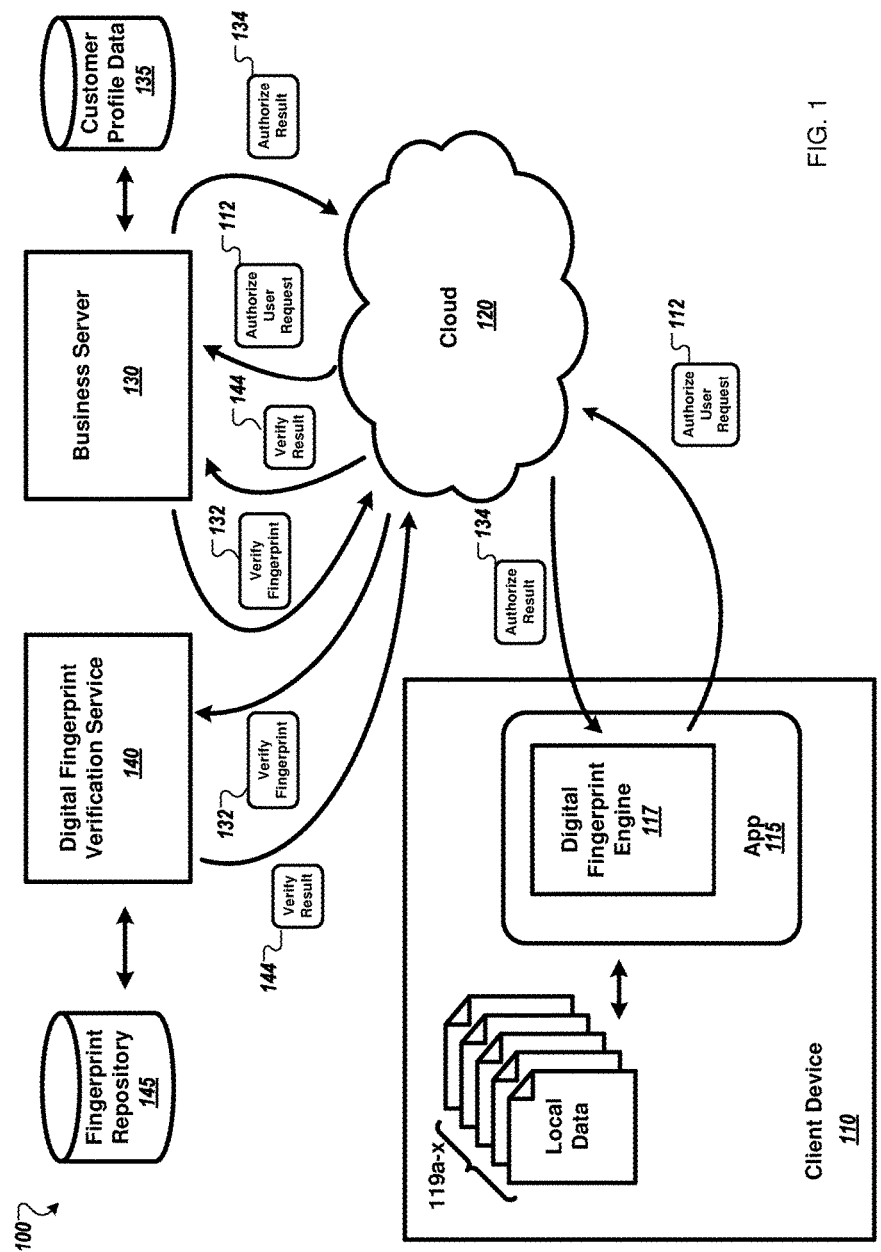
Figure 2:
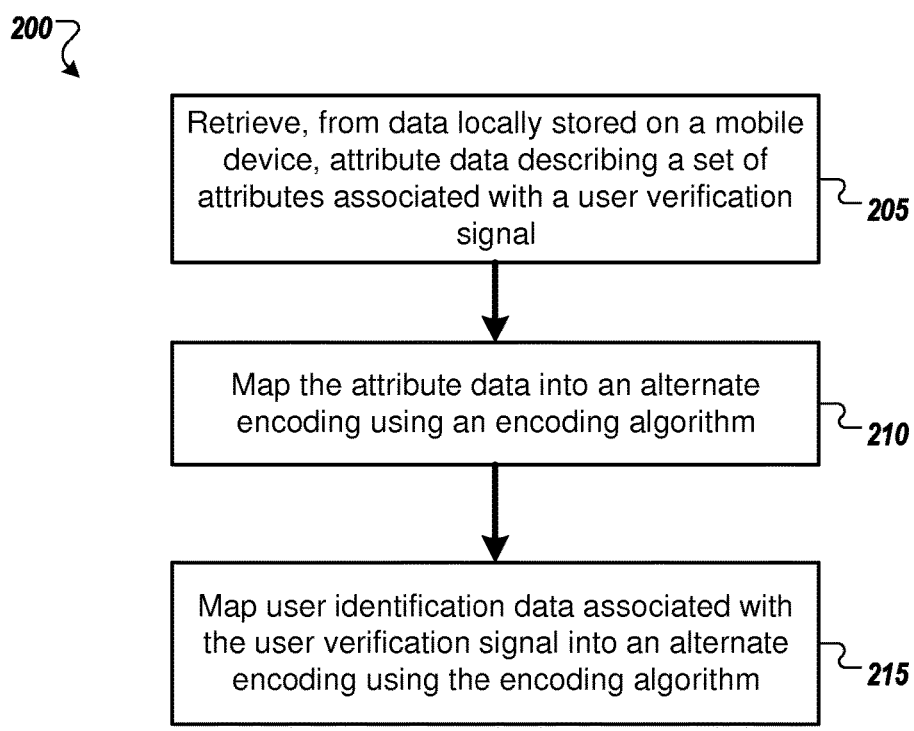
Figure 3:
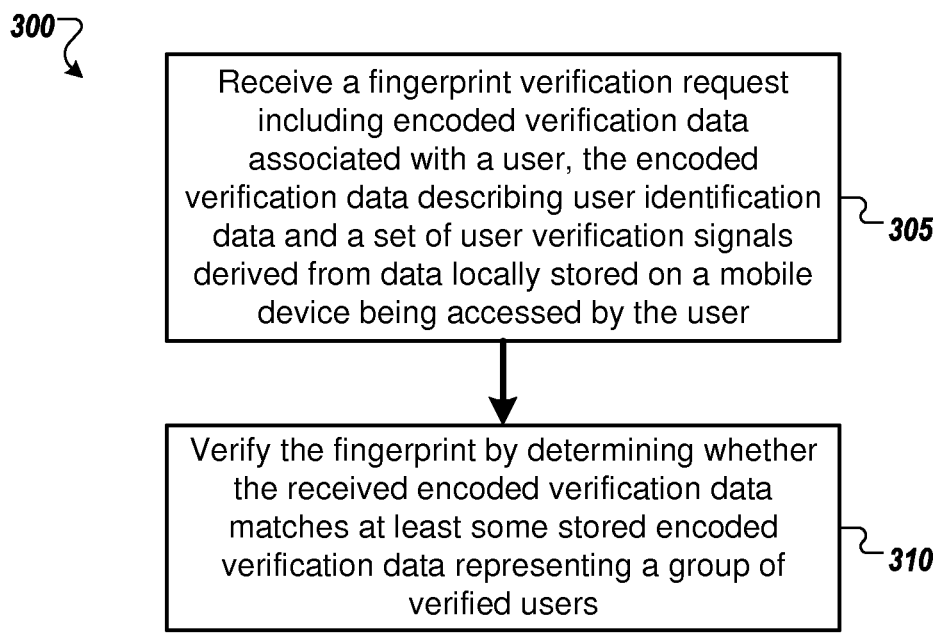
Figure 4:
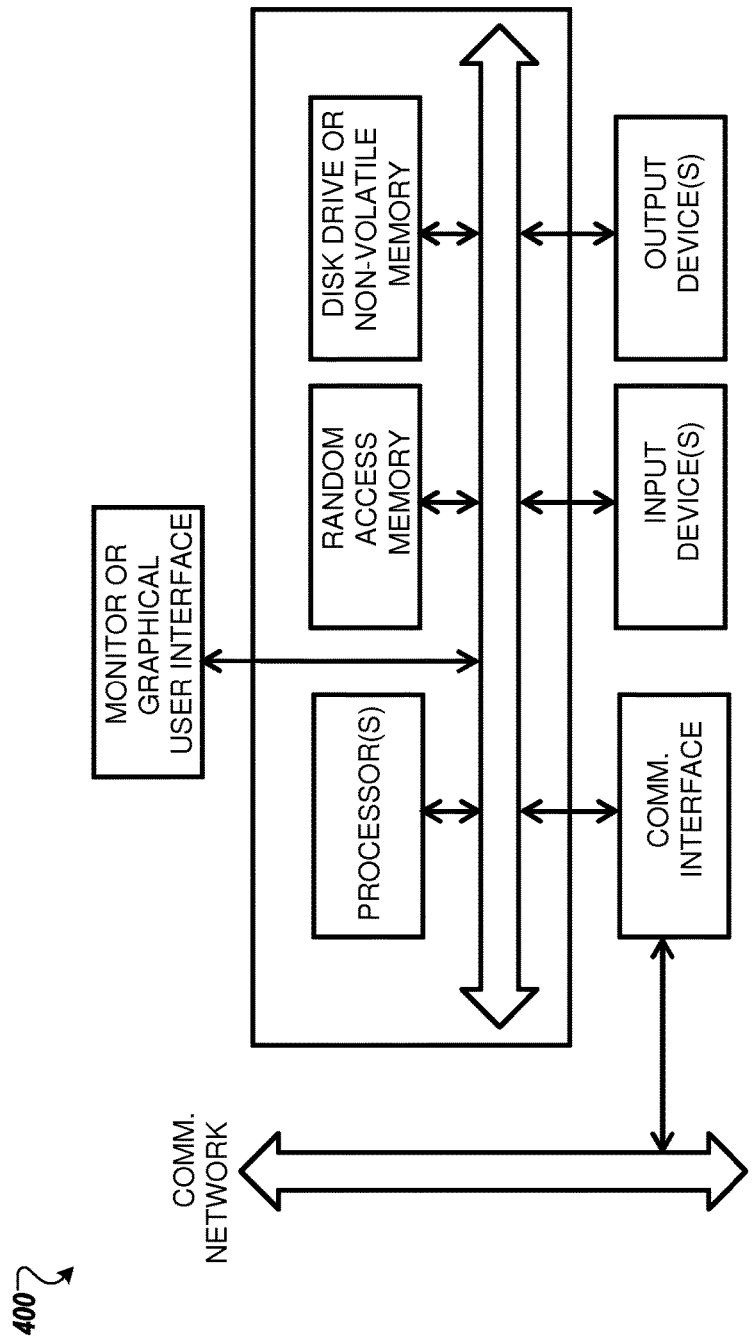

Having thus described the invention in general terms, reference will now be made to the accompanying drawings, which are not necessarily drawn to scale, and wherein:

FIG. 1 illustrates an example system that can be configured to implement a sequence of events, at least some of which can be in response to user interactions with the system that facilitate providing a user verification service based on analyzing user verification signals derived from out-of-band data in accordance with some embodiments discussed herein;

FIG. 2 is a flow diagram of an example method for generating a set of user verification signals derived from data locally stored on a client device being accessed by a user in accordance with some embodiments discussed herein;

FIG. 3 is a flow diagram of an example method for verifying a set of digital fingerprints in response to receiving a fingerprint verification request in accordance with some embodiments discussed herein; and FIG. 4 depicts a computer system capable of embodying a portion of the present invention.

DETAILED DESCRIPTION

The present invention now will be described more fully hereinafter with reference to the accompanying drawings, in which some, but not all embodiments of the invention are shown. Indeed, this invention may be embodied in many different forms and should not be construed as being limited to the embodiments set forth herein; rather, these embodiments are provided so that this disclosure will satisfy applicable legal requirements. Like numbers refer to like elements throughout.

As described herein, system components can be communicatively coupled to one or more of each other. Though the components are described as being separate or distinct, two or more of the components may be combined into a single process or routine. The component functional descriptions provided herein including separation of responsibility for distinct functions is by way of example. Other groupings or other divisions of functional responsibilities can be made as necessary or in accordance with design preferences.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data may be received directly from the another computing device or may be received indirectly via one or more intermediary computing devices, such as, for example, one or more servers, relays, routers, network access points, base stations, and/or the like. Similarly, where a computing device is described herein to send data to another computing device, the data may be sent directly to the another computing device or may be sent indirectly via one or more intermediary computing devices, such as, for example, one or more servers, relays, routers, network access points, base stations, and/or the like.

As used herein, the term "out-of-band data" refers to any type or source of data not directly supplied by the user (e.g., data on the user's device, such as a user's personal data including his contact address book, his musical selections, and the like); and data related to how the user connects the device (e.g., wireless carrier info, cable provider connection data, and the like). Out-of-band data may be beyond the reach of the user to modify (e.g., wireless carrier-supplied tower-based user location); difficult for the user to easily edit (e.g., the serial number of a mobile phone); or user accessible (e.g., the address book).

As used herein, the term "locally stored data" refers to data stored in permanent (internal) memory of a device; stored in "added in" types of memory (e.g., SD Card memory storage, or micro SD memory storage) on a device; and/or stored in "virtual memory storage" of a device (e.g., GoogleDrive, DropBox, Microsoft OneDrive and the like that is associated with a device).

As used herein, the terms "fingerprint," "digital fingerprint," and "user authentication digital fingerprint" may be used interchangeably to refer to encoded user verification data representing out-of-band data stored locally on that device.

As used herein, the term application or "app" is used to refer to a software application that is executed on a device. The term "mobile app" is used to refer to an app hosted on a mobile device (e.g., a mobile phone, a tablet, a laptop, and the like).

As used herein, the term "hash function" is used to refer to any function that can be used to map digital data of arbitrary size to another set of digital data (e.g., of fixed size). The values returned by a hash function may be called hash values, hash codes, or hashes.

In this regard, described herein are examples of technologies relating to providing a framework for providing a user verification service based on analyzing digital fingerprint signals derived from out-of-band data (i.e., data not directly supplied by the user).

FIG. 1 illustrates an example system 100 that can be configured to implement a sequence of events, at least some of which can be in response to user interactions with the system that facilitate providing a digital fingerprint verification service based on analyzing user verification signals ("digital fingerprints" hereinafter) derived from out-of-band data. In embodiments, system 100 is a cloud-based system that comprises a client device 110 with which a user interacts, the client device 110 being configured to host at least one app 115 that connects via the cloud 120 to a business server 130, and that includes a digital fingerprint engine 117 for generating a digital fingerprint containing a set of user verification signals derived from one or a combination of data sources 119a-x local to the client device 110; a business server 130 configured to receive a user authorization request 112 from the app 115, the authorization request including user identification data and the digital fingerprints generated by the digital fingerprint engine 117, the business server 130 being further configured to authorize the user based on verification of the digital fingerprint in addition to verification of the user identification information using a customer profile repository 135, and to return an authorization result 134 to the app 115; and a digital fingerprint verification service 140 configured to receive a fingerprint verification request 132 including at least one digital fingerprint, to verify the received digital fingerprints, and to return the verification result 144 to the initiator of the fingerprint verification request 132.

In some embodiments, the digital fingerprint verification service 140 is deployed as a separate cloud-based service that processes digital fingerprint verification requests 132 from a group of different businesses using a fingerprint repository 145 storing the digital fingerprints of users who have interacted previously with at least one of the businesses in the group. In some alternative embodiments, the digital fingerprint verification service 140 is deployed as a component of the business server 130, and the fingerprint repository 145 stores the digital fingerprints of users who have interacted previously with the business. The deployment choice of the digital fingerprint verification service 140 is an implementation decision, and is not critical to the invention.

In some embodiments, a digital fingerprint engine 117 can be a separate functional component that is integrated into any app 115 designed to connect to a business server 130 via the cloud 120. In some embodiments in which the digital fingerprint verification service 140 is implemented as a separate service, the digital fingerprint verification service 140 may provide a Software Development Kit (SDK) to facilitate integrating a digital fingerprint engine 117 instance into an app along with the app's native functionality. Thus, for example, in some embodiments, the same set of generated digital fingerprints may be accessed by several apps respectively including instances of the digital fingerprint engine 117 and hosted on the same client device to verify a user who is connecting with any of a group of businesses by interacting with any of those apps.

In some embodiments, the digital fingerprint engine 117 reads various device or user data 119a-x and then creates one or more digital fingerprints representing out-of-band data stored locally on that device. The data may include certain one or multiple personal data items (e.g., contact, calendar, photo items, and music selections), device serial number, device UUID number, device phone number, and the like. The one or more digital fingerprints can later be matched against stored digital fingerprints representing previously verified users to determine when this same user logs into the same or another application at a later time.

In some embodiments, a generated set of digital fingerprints may be locally cached on the client device for later access by a digital fingerprint engine 117. In some embodiments, the digital fingerprint engine 117 may be further configured to determine whether the local data used to generate a cached fingerprint has changed (e.g., addition, deletion, or modification of data) and, if the data has changed, to regenerate the digital fingerprints. In some embodiments, the digital fingerprint engine 117 may notify the digital fingerprint verification service 140 that a digital fingerprint has changed, supplying the regenerated digital fingerprint and/or a delta representing the change so that the digital fingerprint verification service 140 may update the stored digital fingerprints in the fingerprint repository 145.

FIG. 2 is a flow diagram of an example method 200 for generating a set of user verification signals derived from data locally stored on a client device being accessed by a user. For convenience, the method 200 will be described with respect to a system that includes one or more computing devices and performs the method 200. Specifically, the method 200 will be described with respect to generating a digital fingerprint by digital fingerprint engine 117.

In embodiments, the system retrieves 205 attribute data describing a set of attributes associated with a user verification signal from data 119a-x locally stored on a client device 110.

In embodiments, the system maps 210 the attribute data into an alternate encoding using a one-way encoding algorithm. For example, in some embodiments, the one-way encoding algorithm is a hash function, and the alternate encoding is a hash. This one-way ensures that the user verification signal being generated will function as a fingerprint for verifying a particular user, but also ensures that the user's information remains anonymous. The choice of encoding algorithm is an implementation choice, and thus is not critical to the invention.

An example user verification signal, presented for illustration and not limitation, is a user's musical fingerprint representing, in some embodiments, one or a combination of a hash of each song or album (stored or streamed/listened to) on the user's music library; a histogram (count) to indicate the relative number of different songs stored for each musical type (e.g., rap, jazz, country); and a histogram (count) to indicate the relative number of different songs listened to (i.e., used for streaming accounts, which sometimes don't store but only play) for each musical type. If, for example, a user verification signal indicated that the user listed 70% rap songs on the client device, it's likely to match a previously generated signal for that user (possibly generated from a different client device) that the user listed 90% classical music.

A second example of user verification signal, presented for illustration and not limitation, is a user's physical motion data. A user's walking style (types of accelerations, decelerations) are often today stored on the user's phone. This data can also provide a "motion fingerprint" of the user—walking style, etc. Motion data could be of the macro physical motion type (walking) but also the style/speed of the user's finger inputs (stroke type, arc style, pressure, style, time delays, direction, and the like) of one or more finger inputs on a touch-screen. Some people "type" on a touch-screen with always one finger, other people hold a tablet with two arms and "type" with two or more different fingers, etc.

In embodiments, a digital fingerprint may include a large quantity of encoded values that each represent various data elements within the client device. In some embodiments, there is a minimum threshold size of data elements to be included in a generated digital fingerprint to ensure that future comparisons will be based on a representative amount of data. Thus, for example, an address book containing just 3 contacts would not be included in a generated digital fingerprint. In some embodiments, to enable rapid matching, a verification signal may be derived by subsampling a locally stored data source that includes an amount of data elements that satisfies the minimum threshold size. In some embodiments, a set of different subsampling algorithms may be used to randomly subsample a data source to generate multiple data sets.

As an example for illustration and not limitation, a fingerprint may be generated based on attributes associated with each of the 1000 contacts in the contact list of the client device. The contents of each contact (data in all or a pre-determined number of attribute fields) may be hashed, and the hashed information corresponding to the contacts may be included in the fingerprint. It should be noted that, for example, the fingerprint may include hashed attributes from all the contacts, the first N contacts, the last N contacts, the first N contacts starting with a specific letter, or any other predetermined rule. N could be any integer number. The choice of rule is not critical to the invention.

In some embodiments, the time delta of fingerprint generation may be included in the user verification signal. Turning to the 100 element contact list example, the 1000 output hashes currently generated can be compared to the previously generated 1000 output hashes to see if a user probably "looks like the same user." If the time difference between the generating of those two has been <24 hours, then we might expect up to a maximum threshold of address book changes (e.g., 20) to have occurred within 24 hours. However, if, for example, the number of changes is significantly greater than the maximum threshold (e.g., 900 out of the 1000 address book contacts changed within the past 24 hours), then it's very likely that the user verification signal does not represent the same user.

In embodiments, the system maps 215 user identification data associated with the user (e.g., one or a combination of phone number of the user, email address, personal information such as social security number, login user id, and password) into an alternate encoding using the same encoding algorithm used for the digital fingerprints. In some embodiments, digital fingerprint engine 117 transmits an initial set of generated digital fingerprints to the fingerprint service 140, which stores the initial set of generated digital fingerprints in the fingerprint repository 145 so that the digital fingerprints may be used in processing future fingerprint verification requests 132. In some embodiments, the encoded user identification data in the fingerprint may be used to determine that the digital fingerprints received in a fingerprint verification request 132 have been stored previously, associated with the same user.

FIG. 3 is a flow diagram of an example method 300 for verifying a set of digital fingerprints in response to receiving a fingerprint verification request. For convenience, the method 300 will be described with respect to a system that includes one or more computing devices and performs the method 300. Specifically, the method 300 will be described with respect to verifying a set of digital fingerprints by digital fingerprint verification service 140.

In embodiments, the system receives 305 a fingerprint verification request that includes encoded verification data associated with a user. In some embodiments, the encoded verification data can include user identification data (e.g., one or a combination of phone number of the user, email address, personal information such as social security number, login user id, and password) as well as a set of digital fingerprints derived from out-of-band data locally stored on a client device being accessed by the user (e.g., one or multiple personal data items (e.g., contact, calendar, photo items etc.), device serial number, device UUID number, device phone number, and the like).

In embodiments, the system verifies 310 the fingerprint by determining whether the received encoded verification data matches at least some stored encoded verification data representing a group of verified users (e.g., encoded verification data stored in the fingerprint repository 145).

In some embodiments, verification of data does not depend on finding a perfect match; an approximate match may suffice. Turning to the example of a hashed fingerprint based on a contact list stored on the user's client device, the encoded verification data included in the fingerprint request may include data from contacts that recently were added to the list. Thus, the digital fingerprints to be verified may not exactly match with the data stored in the fingerprint repository (e.g., 9 out of 10 contacts match). In some embodiments, the system calculates a verification score representing a probability that the encoded verification data included in the fingerprint request match stored data representing a verified user. In some embodiments, the verification score is compared to a verification score threshold, and the system calculates a verification result based on whether the verification score satisfies the verification score threshold.

In some embodiments, the digital fingerprint verification service 140 maintains a stored set of verified fingerprint data representing a group of blacklisted users (e.g., users known by the businesses to have undesirable traits such as bad credit, late payments, and the like). In some embodiments, the encoded verification data included in the fingerprint request may be compared to the data representing the group of blacklisted users and, if at least a high probability match is determined, the system returns a verification result indicating that the user represented by the fingerprint is not verified.

FIG. 4 is representative of a computer system 400 capable of embodying a portion of the present invention. It will be readily apparent to one of ordinary skill in the art that many other hardware and software configurations are suitable for use with the present invention. For example, the computer may be a desktop, laptop, portable, rack-mounted, smart phone or tablet configuration. Additionally, the computer may be a series of networked computers. Further, the use of other microprocessors are contemplated, such as Pentium™ or Itanium™ microprocessors; Opteron™ or AthlonXP™ microprocessors from Advanced Micro Devices, Inc; embedded processors such as ARM® licensed from ARM® Holdings plc., and the like. Further, other types of operating systems are contemplated, such as Windows®, WindowsXP®, WindowsNT®, WindowsRT® or the like from Microsoft Corporation, Solaris from Sun Microsystems, LINUX, UNIX, or mobile operating systems such as Android® from Google Inc., iOS® from Apple Inc., Symbion® from Nokia Corp., and the like. In still other embodiments, the techniques described above may be implemented upon a chip or an auxiliary processing board.

Various embodiments of the present invention can be implemented in the form of logic in software or hardware or a combination of both. The logic may be stored in a computer readable or machine-readable non-transitory storage medium as a set of instructions adapted to direct a processor of a computer system to perform a set of steps disclosed in embodiments of the present invention. The logic may form part of a computer program product adapted to direct an information-processing device to perform a set of steps disclosed in embodiments of the present invention. Based on the disclosure and teachings provided herein, a person of ordinary skill in the art will appreciate other ways and/or methods to implement the present invention.

The above embodiments of the present invention are illustrative and not limiting. The above embodiments of the present invention may be combined, in one or multiple combinations, as various alternatives and equivalents are possible. Although the invention has been described with reference to a mobile device, it is understood that the invention is not limited by the type of device. Although the invention has been described with reference to certain radio communications interface by way of an example, it is understood that the invention is not limited by the type of radio, wireless, or wired communications interface. Although, the invention has been described with reference to certain operating systems by way of an example, it is understood that the invention is not limited by the type of operating systems. Other additions, subtractions, or modifications are obvious in view of the present disclosure and are intended to fall within the scope of the appended claims Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. For example, while examples involving books and multi-media applications are discussed herein, some embodiments can be configured to annotate and/or otherwise re-bundle and share any suitable type of media. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for generating a plurality of user verification signals, each derived from attribute data stored on a client device and configured to function as a digital fingerprint, the digital fingerprint configured to be transmitted with encoded user identification data on at least a first occasion and a second occasion, the first occasion for causing storage of the digital fingerprint with the encoded user identification data and the second time for causing retrieval of the digital fingerprint from the first occasion utilizing the encoded user identification data and determining a match with at least a predetermined portion of the digital fingerprint from the second occasion, the method comprising:

receiving an authorization request from an app executing on the client device, the request including user identification data associated with the user;

for each user verification signal in the set of user verification signals, retrieving, from the client device, attribute data describing a set of attributes associated with the signal, the attribute data being locally stored on the client device; and mapping the attribute data into an alternate encoding using a one-way encoding algorithm, thereby ensuring that the user identification information remains anonymous; and mapping the user identification data into an alternate encoding using the same encoding algorithm, the user identification information and the attribute data being different;

generating the digital fingerprint including the set of user verification signals derived from data locally stored on a client device being accessed by a user, wherein each user verification signal represents an alphabetized contact list, and wherein mapping the attribute data into an alternate encoding comprises:

generating a subset of the contacts in the contact list by selecting a predetermined quantity of representative contacts associated with each of the letters in the alphabet; and for each contact in the subset of the contacts in the contact list, extracting contact attribute data from each of a pre-defined set of fields; and for the contact attribute data in each of the set of fields, calculating a hash using the hash function; and causing transmission of the digital fingerprint and the encoded user identification data.

2. The method of claim 1, wherein the set of user verification signals includes at least one of a contact list, a calendar, a set of digital photos, user musical selections, and data related to how the user connects the device.

3. The method of claim 1, wherein the one-way encoding algorithm is a hash function, and wherein each alternate encoding is a hash calculated using the hash function.

4. The method of claim 3, wherein the verification signal represents a contact list, and wherein mapping the attribute data into an alternate encoding comprises:

for each contact in the contact list, extracting contact attribute data from each of a pre-defined set of contact fields; and for the contact attribute data in each of the set of contact fields, calculating a hash using the hash function.

5. The method of claim 1, further comprising caching each of the alternate encodings.

6. A computer-implemented method for verifying a set of user verification signals, each derived from attribute data stored on a client device and configured to function as a digital fingerprint, the digital fingerprint configured to be received with encoded user identification data on at least a first occasion and a second occasion, the first occasion for causing storage of the digital fingerprint with the encoded user identification data and the second time for causing retrieval of the digital fingerprint from the first occasion utilizing the encoded user identification data and determining a match with at least a predetermined portion of the digital fingerprint from the second occasion, the method comprising:

receiving encoded verification data associated with the user, the encoded verification data comprising the encoded user identification data and the set of user verification signals, wherein each user verification signal represents an alphabetized contact list, and wherein mapping the attribute data into an alternate encoding comprises:

generating a subset of the contacts in the contact list by selecting a predetermined quantity of representative contacts associated with each of the letters in the alphabet; and for each contact in the subset of the contacts in the contact list, extracting contact attribute data from each of a pre-defined set of fields; and for the contact attribute data in each of the set of fields, calculating a hash using the hash function;

utilizing the encoded user identification data to retrieve, from storage, a digital fingerprint associated with the encoded user identification data; and verifying the user by determining whether the received encoded verification data matches at least a predetermined portion of the stored encoded verification data representing a group of verified users.

7. The method of claim 6, wherein the set of user verification signals includes at least one of a contact list, a calendar, a set of digital photos, user musical selections, and data related to how the user connects the client device.

8. The method of claim 6, wherein verifying the user comprises: calculating a verification score based on an amount of the received encoded verification data determined to match the stored encoded verification data;

comparing the verification score to a verification score threshold; and verifying the user in an instance in which the verification score satisfies the verification score threshold.

9. The method of claim 6, wherein verifying the user further comprises:

determining whether the received encoded verification data matches at least some stored encoded verification data representing a blacklisted group of users;

calculating a verification score based on an amount of the received encoded verification data determined to match the stored encoded verification data;

comparing the verification score to a verification score threshold; and further identifying the user as a blacklisted user in an instance in which the verification score satisfies the verification score threshold.

10. The method of claim 6, wherein the received encoded verification data and the stored encoded verification data are encoded as hashes each calculated using a particular hash function.

11. A system configured for verifying a set of user verification signals, each derived from attribute data stored on a client device and configured to function as a digital fingerprint, the digital fingerprint configured to be received with encoded user identification data on at least a first occasion and a second occasion, the first occasion for causing storage of the digital fingerprint with the encoded user identification data and the second time for causing retrieval of the digital fingerprint from the first occasion utilizing the encoded user identification data and determining a match with at least a predetermined portion of the digital fingerprint from the second occasion, the system comprising:

one or more computers and one or more storage devices storing instructions that are operable, when executed by the one or more computers, to cause the one or more computers to provide:

a digital fingerprint verification service configured to receive digital fingerprint verification requests, wherein each digital verification request includes encoded verification data associated with a user, the encoded verification data describing the digital fingerprint comprising the user identification data and the set of user verification signals derived from data locally stored on the client device being accessed by the user, and wherein the service performs operations comprising:

receiving, from the client device, a user verification request generated by an app executing on the client device;

generating a verification result by utilizing the encoded user identification data to retrieve, from storage, the digital fingerprint associated with the encoded user identification data; and determining whether the encoded verification data included in the verification request matches at least a predetermined portion of the stored encoded verification data representing a group of verified users; and transmitting the verification result to the client device, wherein each user verification signal represents an alphabetized contact list, and wherein mapping the attribute data into an alternate encoding comprises:

generating a subset of the contacts in the contact list by selecting a predetermined quantity of representative contacts associated with each of the letters in the alphabet; and for each contact in the subset of the contacts in the contact list, extracting contact attribute data from each of a pre-defined set of fields; and for the contact attribute data in each of the set of fields, calculating a hash using the hash function.

12. The system of claim 11, wherein the set of user verification signals includes at least one of a contact list, a calendar, a set of digital photos, user musical selections, and data related to how the user connects the client device.

13. The system of claim 11, wherein generating the verification result comprises:

calculating a verification score based on an amount of the received encoded verification data determined to match the stored encoded verification data;

comparing the verification score to a verification score threshold; and generating the verification result as verifying the user in an instance in which the verification score satisfies the verification score threshold.

14. The system of claim 11, wherein generating the verification result further comprises:

determining whether the received encoded verification data matches at least some stored encoded verification data representing a blacklisted group of users;

calculating a verification score based on an amount of the received encoded verification data determined to match the stored encoded verification data;

comparing the verification score to a verification score threshold; and generating the verification result including identifying the user as a blacklisted user in an instance in which the verification score satisfies the verification score threshold.

15. The system of claim 11, wherein the received encoded verification data and the stored encoded verification data are encoded as hashes each calculated using a particular hash function.

16. A computer program product configured for verifying a set of user verification signals, each derived from attribute data stored on a client device and configured to function as a digital fingerprint, the digital fingerprint configured to be received with encoded user identification data on at least a first occasion and a second occasion, the first occasion for causing storage of the digital fingerprint with the encoded user identification data and the second time for causing retrieval of the digital fingerprint from the first occasion utilizing the encoded user identification data and determining a match with at least a predetermined portion of the digital fingerprint from the second occasion, stored on a non-transitory computer readable medium, comprising instructions that when executed on one or more computers cause the one or more computers to provide:

a digital fingerprint verification service configured to receive digital fingerprint verification requests, wherein each digital verification request includes encoded verification data associated with a user, the encoded verification data describing the digital fingerprint comprising the user identification data and the set of user verification signals derived from data locally stored on the client device being accessed by the user, and wherein the service performs operations comprising:

receiving, from a client device associated with the user, a digital fingerprint verification request generated by an app executing on the client device;

generating a verification result by utilizing the encoded user identification data to retrieve, from storage, the digital fingerprint associated with the encoded user identification data; and determining whether the encoded verification data included in the verification request matches at least a predetermined portion of stored encoded verification data representing a group of verified users; and transmitting the verification result to the client device, wherein each user verification signal represents an alphabetized contact list, and wherein mapping the attribute data into an alternate encoding comprises:

generating a subset of the contacts in the contact list by selecting a predetermined quantity of representative contacts associated with each of the letters in the alphabet; and for each contact in the subset of the contacts in the contact list, extracting contact attribute data from each of a pre-defined set of fields; and for the contact attribute data in each of the set of fields, calculating a hash using the hash function.

17. The computer program product of claim 16, wherein the set of user verification signals includes at least one of a contact list, a calendar, a set of digital photos, user musical selections, and data related to how the user connects the client device.

18. The computer program product of claim 16, wherein generating the verification result comprises:
   calculating a verification score based on an amount of the received encoded verification data determined to match the stored encoded verification data;
   comparing the verification score to a verification score threshold; and
   generating the verification result as verifying the user in an instance in which the verification score satisfies the verification score threshold.

19. The computer program product of claim 16, wherein generating the verification result further comprises:
   determining whether the received encoded verification data matches at least some stored encoded verification data representing a blacklisted group of users;
   calculating a verification score based on an amount of the received encoded verification data determined to match the stored encoded verification data;
   comparing the verification score to a verification score threshold; and
   generating the verification result including identifying the user as a blacklisted user in an instance in which the verification score satisfies the verification score threshold.

20. The computer program product of claim 16, wherein the received encoded verification data and the stored encoded verification data are encoded as hashes each calculated using a particular hash function.

* * * * *